United States Patent [19]

Dahman et al.

[11] Patent Number: 5,450,384
[45] Date of Patent: Sep. 12, 1995

[54] FAST FORMATTING OF MEDIA IN AN OPTICAL LIBRARY

[75] Inventors: Kirby G. Dahman; Kenneth F. Day, III; Alfredo M. Diaz; William D. LaMear, Jr., all of Tucson, Ariz.; Edward R. Morse, Boulder, Colo.

[73] Assignee: International Business Machines Corporation, Armonk, N.Y.

[21] Appl. No.: 151,239

[22] Filed: Nov. 12, 1993

[51] Int. Cl.⁶ .............................................. G11B 17/22
[52] U.S. Cl. ........................................ 369/30; 360/71; 360/72.2; 360/48
[58] Field of Search .................. 369/30, 33, 34, 36, 369/39, 44.26, 37, 38; 364/478; 360/92, 71, 72.2, 48, 40, 69, 91, 97.01

[56] References Cited

U.S. PATENT DOCUMENTS

| | | | |
|---|---|---|---|
| 4,680,653 | 7/1987 | Ng et al. ........................... | 360/72.2 |
| 4,945,428 | 7/1990 | Waldo ................................ | 360/92 |
| 5,164,909 | 11/1992 | Leonhardt et al. ................. | 364/478 |
| 5,193,081 | 3/1993 | Osawa et al. ...................... | 369/44.26 |
| 5,202,799 | 4/1993 | Hetzler et al. ..................... | 360/48 |

*Primary Examiner*—Ali Neyzari
*Attorney, Agent, or Firm*—D. A. Shifrin

[57] ABSTRACT

Fast formatting of DASD emulating sectors on optical media is provided to reduce initialization time. Rather than format each track media when a new surface of an optical media is mounted in an optical storage library, a table is created on the media containing a set of entries for each track on the media surface. During initialization, a first table entry for each track is set to indicate that the state of the track is reliably KNOWN and a second entry is set to indicate that the track is virgin (unrecorded). Prior to a subsequent data access operation, the track table is copied from the media into a corresponding table in memory and each first entry in the media table is changed to indicate an UNKNOWN state. The memory track table is updated during the data access operations to reflect newly recorded or updated sectors. Upon completion of the data access, the media table is overwritten with the updated memory table.

7 Claims, 3 Drawing Sheets

FAST FORMATTING OF MEDIA IN AN OPTICAL LIBRARY

TECHNICAL FIELD OF THE INVENTION

The present invention relates to automated optical libraries, and in particular, to fast formatting of media in such libraries.

BACKGROUND OF THE INVENTION

Recent advances have enabled users of computer hardware to emulate large, permanently mounted, magnetic direct access storage device (DASD) volumes with a library of removable magneto-optical (MO) media. Such emulation offers the user substantial benefits, including lower cost per megabyte and reduced space requirements. For example, one permanently mounted volume of IBM Corporation's 3390 Model 2, a large DASD system employing ECKD (a trademark of the IBM Corporation) architecture, is formatted with 2,226 cylinders, each having 15 tracks at 56,664 bytes per track. During formatting, a home address (HA) and record 0 (R0) field is written to each track in the volume, a process which requires about four to five hours to complete (and includes a one-pass write procedure and no mount/demount delays).

Emulation of such a DASD can be achieved with a smaller, less expensive, automated data storage and retrieval system, such as IBM Corporation's 3995 Model 151 optical library with the capacity for as many as 144 double-sided optical disk cartridges and as many as four optical disk drives. Each DASD volume can be emulated with six optical disk surfaces (three disk cartridges); each disk surface emulates 5565 DASD tracks divided into 56 1024-byte sectors. Initializing each emulated track with the HA and R0 fields requires about 42 minutes per surface or about 200 hours to initialize an entire 144-cartridge library—over eight days—during which the library is not available to the user. Using multiple drives in parallel can reduce the time but, even in a library having four optical drives, the initialization time is still about 50 hours.

Additionally, when data is to be read from a track on the disk, the entire 56-sector track is read into a track buffer, even if the data only occupies a single sector and the remaining sectors are unrecorded. Similarly, when data is written to a track, an image of the entire track is copied from the buffer, again even if the data only occupies a single sector and the remaining sectors are unrecorded. Consequently, data input/output efficiency suffers.

SUMMARY OF THE INVENTION

In view of the foregoing, it is an object of the present invention to reduce the amount of time required to initialize a DASD-emulating optical library.

It is another object to increase the efficiency of data input/output operations.

These and other objects are achieved in this invention by initializing each recording surface in an optical library with the surface's volume serial number (VOLSER) and a media track table containing a set of entries for each track on the surface. During initialization, a first entry of each track is set to indicate that the state of the track is reliably KNOWN and a second entry is set to indicate that the track is virgin (unrecorded). After a disk surface is initialized and one or more selected track are to be read from or recorded to, the media track table is copied into a memory track table and each first entry in the media track table is changed to indicate that the state of each track is UNKNOWN. The requested read or write operation proceeds and the memory track table updated to reflect the highest sector number on the selected track(s) which are recorded. Following completion of all read and write operations on the disk surface, the media track table is overwritten with the updated memory track table.

Significant time savings are realized during the formatting a one or more disk surfaces. Moreover, if a system failure occurs after sectors have been recorded or updated but before the media track table is updated and the media demounted, the state of the media track table will remain UNKNOWN. If the disk surface is later mounted, the UNKNOWN state of the media track table will provide warning of a problem and the true state of tracks can be determined by examination of the tracks themselves after which the media track table can be accurately updated.

The foregoing and other features and advantages of the invention will be apparent from the following more particular description of preferred embodiments of the invention, as illustrated in the accompanying drawings.

FIG's. 4, 5 and 6 are flowcharts of portions of the track access procedure of the present invention.

DETAILED DESCRIPTION OF THE INVENTION

Figure 1:
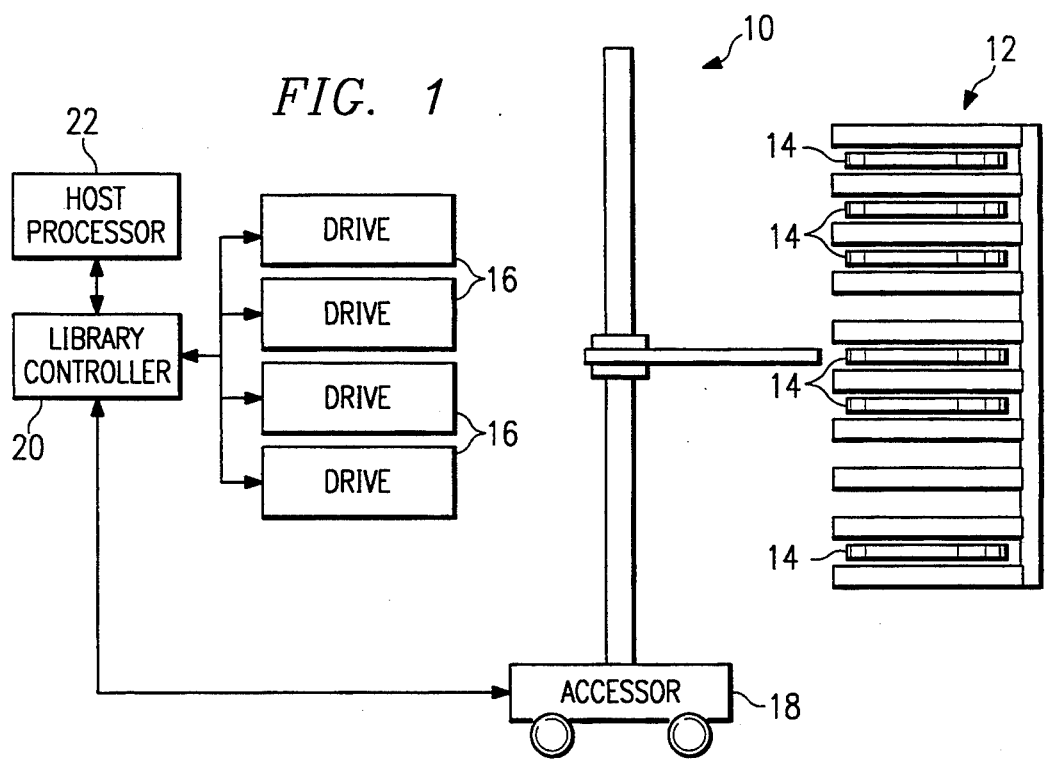
FIG. 1 is a block diagram of an automated storage and retrieval optical library.

FIG. 1 is a block diagram of an automated storage and retrieval optical library 10 to emulate a DASD system. The library 10 has an array of storage cells 12 holding recordable optical media, such as optical disks 14 (typically retained within a protective casing), one or more optical drives 16, an accessor 18 and a library controller 20. The library controller 20 is interconnected between a host device 22 and the drives 16 and accessor 18 and processes data read/write requests from the host 22 by directing the accessor 18 to select one of the disks 14 and transport it to and mount it in one of the drives 16. The drive 16 can then read data from or write data to the selected disk 14, as required. If the optical disk 14 has two recordable surfaces, the accessor will also be capable of removing the disk 14 from the drive 16, turning it over and remounting it in the drive 16 to permit the opposite side of the disk 14 to be accessed.

Figure 2:
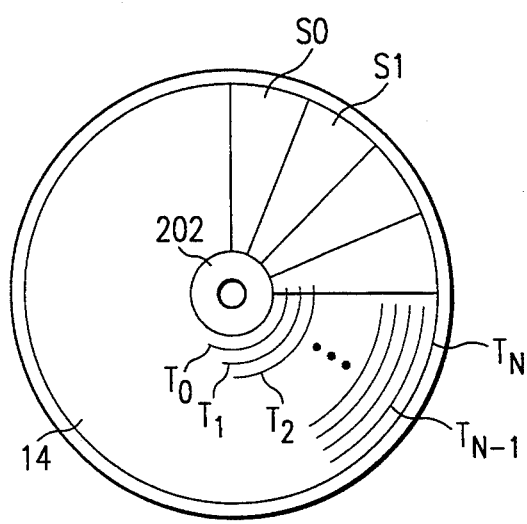
FIG. 2 is a schematic representation of an optical disk.

As illustrated in FIG. 2, a typical optical disk 14 is divided into parallel tracks $T_0$–$T_N$ emanating spirally or concentrically from a center spindle hub 202. Each track T is divided into radial sectors S. Fifty-six optical sectors are made to emulate a DASD track with the following schematic representation:

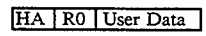

Figure 3:
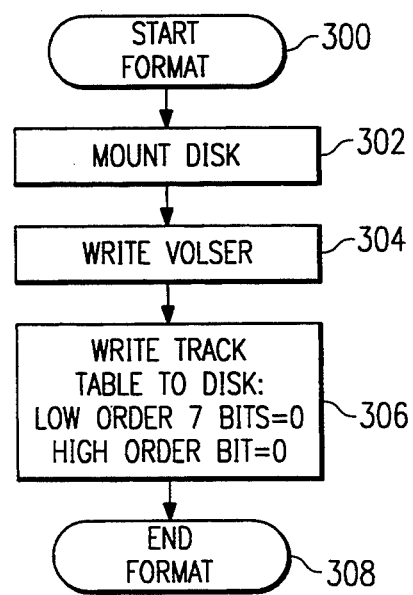
FIG. 3 is a flowchart of the format procedure of the present invention.
Figure 4:
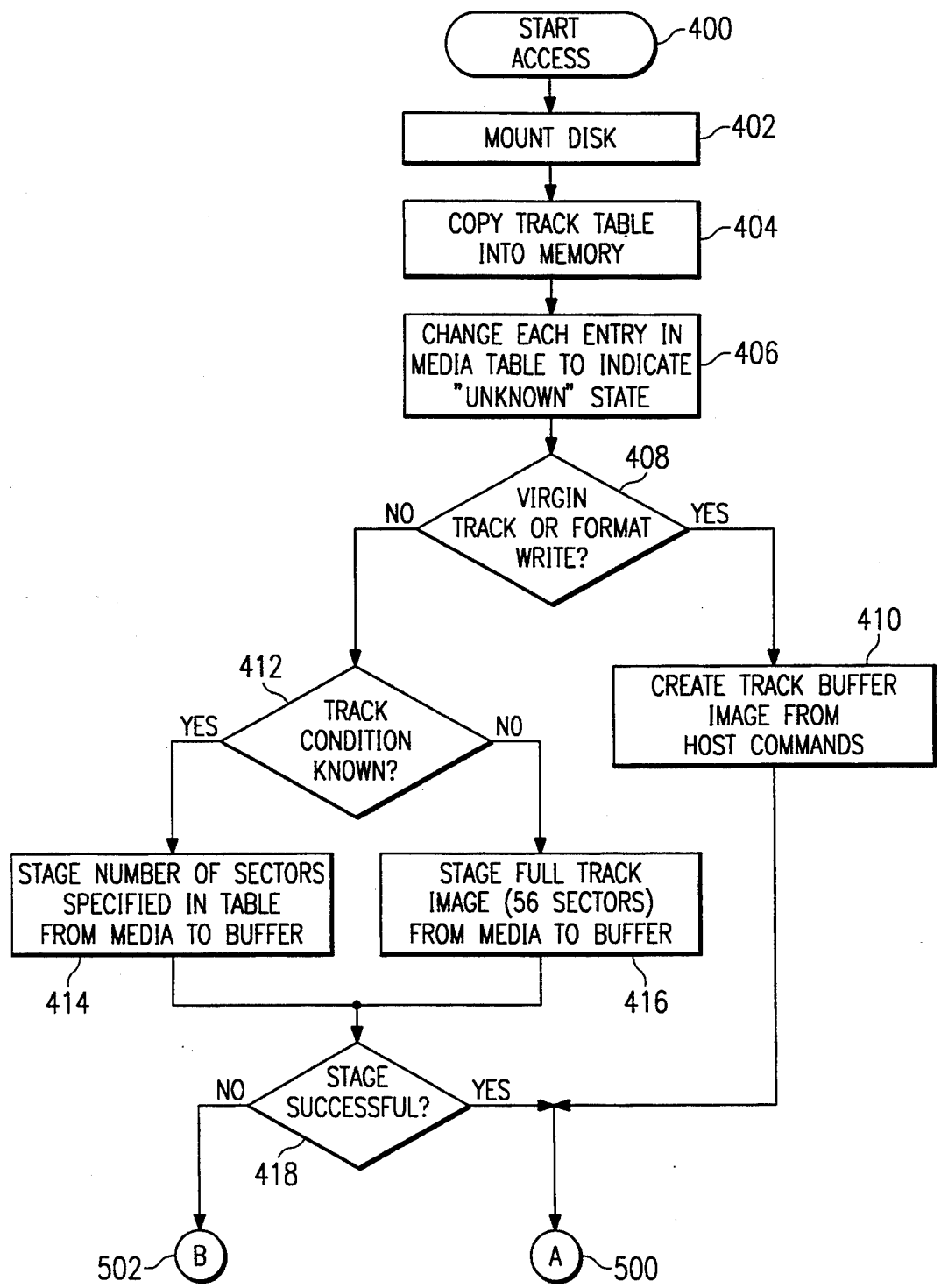
Figure 5:
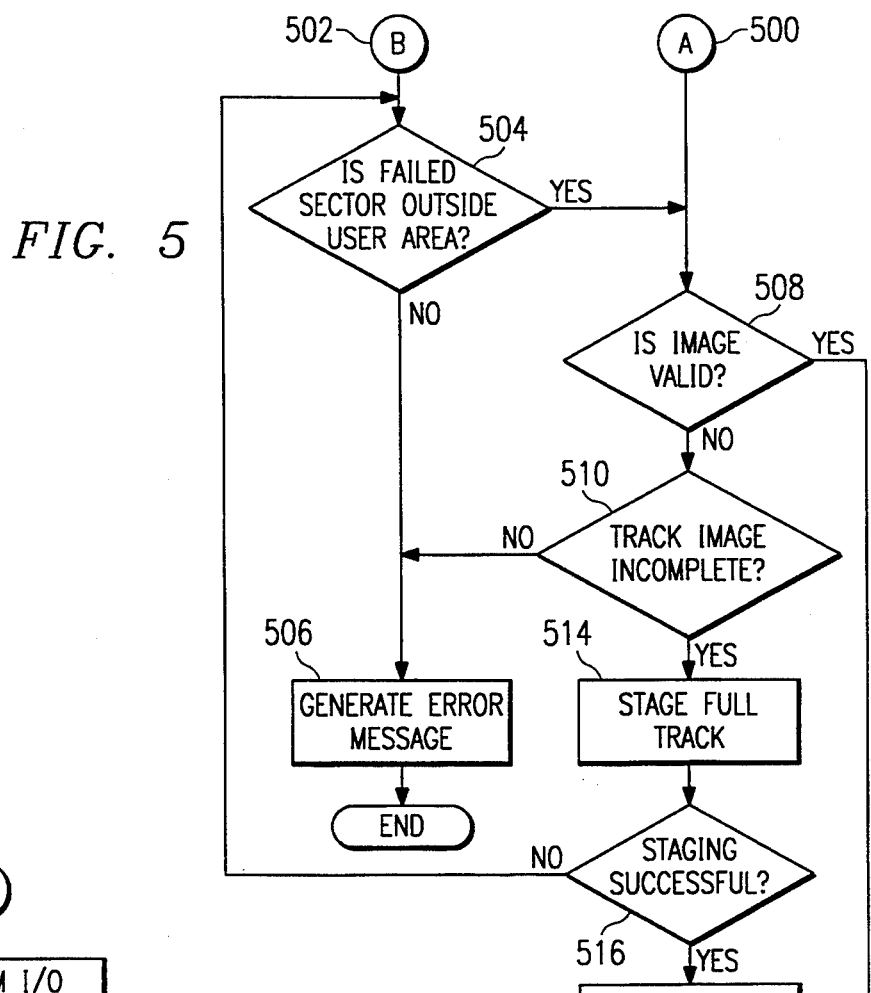

Rather engage in the time consuming process of writing the home address and record 0 fields on each track of each disk surface at the time of initialization, the present invention provides a fast formatting technique which initializes tracks on demand. Referring now to the flowchart of FIG. 3, the format process begins (Step 300) when a new library is installed with a full complement of virgin (unrecorded) disks or subsequently when new disks are added to the library. The accessor 18, at the direction of the library controller 20, selects a disk 14 from the array of storage cells 12 and mounts it in one of the drives 16 (Step 302).

After the disk 14 comes up to speed, the optical head seeks to an ID track and writes the volume serial number (VOLSER) to the first sector in the ID track (Step 304). The library controller 20 then directs that a media track table be written to the next block of sectors in the ID track (Step 306). For a disk surface with 5565 emulated tracks, the media track table will use six sectors in the ID track. The media track table contains two entries for each track (as well as an entry identifying the track by its relative offset): a one-bit flag to indicate the condition of the track and a seven-bit indication of the number of sectors currently recorded on the disk surface. In one embodiment of the present invention, the seven bits of the indicator are the low order bits of a byte while the flag is the high order bit. If a flag is equal to 0, the condition of the corresponding track is UNKNOWN; if the flag is 1, the condition is KNOWN. With respect to the seven-bit indicator, a 0 indicates a virgin track while a number greater than 0 (ie., 1–56) represents the number of recorded sectors which fully contain the emulated DASD track image. It will be appreciated that-the present invention is not limited to the particular table format described herein.

During fast formatting, both the flag and the indicator for each track are set to 0, signifying that each track is virgin and in a KNOWN condition. After the table is recorded on one surface of the disk 14, formatting of the surface is complete. If the disk 14 is double-sided, the accessor 18 removes it from the drive 16, turns it over and remounts it whereupon the opposite side is formatted. After the disk 14 has been completely formatted (Step 308), the accessor 18 removes it from the drive 16 and replaces it in one of the storage cells 12. Another disk can then be mounted and formatted. Even when a conventional three-pass write is performed (erase/write/verify), the process only takes about one second per surface once the disk is mounted. Accessor transport time is about ten seconds. Therefore, the total time required to fast format a full library will be under one hour, considerably faster than formatting even a DASD unit.

After a recording surface of the optical disk 14, or the entire library 10, has been formatted, read and write operations (collectively referred to as track access operations) can proceed at the request of the host processor 22 through instructions to the library controller 20. Track access operations according to the present invention will now be described with reference to the flowcharts of FIG's. 4–6. It will be assumed that the requested disk surface has been formatted as described with respect to FIG. 3; however, for purposes of the following description it will be assumed that the surface is no longer necessarily virgin but that a prior operation could have written information to the surface. Access begins (Step 400) by mounting the disk to which or from which data is to be written or read (Step 402). After confirming that the correct volume has been mounted, the library controller 20 directs that the media track table be copied into memory, which will be referred to as the memory track table (Step 404). The flag entry associated with each track in the media track table (but not in the memory track table) is then reset to indicate that the condition of each track is UNKNOWN (high order bit to 1) (Step 406). If the track is virgin or the requested operation is a format write (in which the entire track is overwritten) such that it is not necessary to stage data from the media to the track buffer in memory (Step 408), a track image is created in the track buffer (Step 410) and the process jumps to point A (Step 500) for further actions.

If, on the other hand, the track is not virgin and the requested operation is a write update (in which only some of the sectors of the track are replaced) or a read, but not a format write, the track's flag entry (high order bit) is examined (Step 412) to determine the track's condition. If the flag indicates that the track condition is KNOWN, the track image is staged from the disk using only the number of sectors specified in the memory track table (low order 7 bits): time is not wasted staging the entire 56 sectors to the buffer. If the flag indicates that the track condition is UNKNOWN, the full track image is staged from the disk using all 56 sectors. If staging is successful (Step 418), the process jumps to point A (Step 500);

If staging is unsuccessful, the process jumps to point B (Step 502) for error recovery. If the failed sector is within the user data area (Step 504), an error message is generated (Step 506) and the process halts. Otherwise, the process jumps to point A (Step 500).

After a jump to point A (Step 500), the track image in the track buffer is examined to determine whether it is VALID; if so, the process jumps to point C (Step 600) for the actual operation to be performed. If the image is INVALID, it is determined whether the track image is incomplete (Step 510); if INVALID and not incomplete, a failure is indicated in the user data area, an error message is generated (Step 506) and the process halts. If the track image is INVALID but incomplete, the full track is staged from the media into the track buffer (Step 514) and another determination made as to the success of the staging (Step 516). If unsuccessful, error diagnostics begin again at point B (Step 502) but if staging is successful, the memory track table is updated to reflect the current values (Step 518) and the process jumps to point C (Step 600) for the actual operation to be performed.

Figure 6:
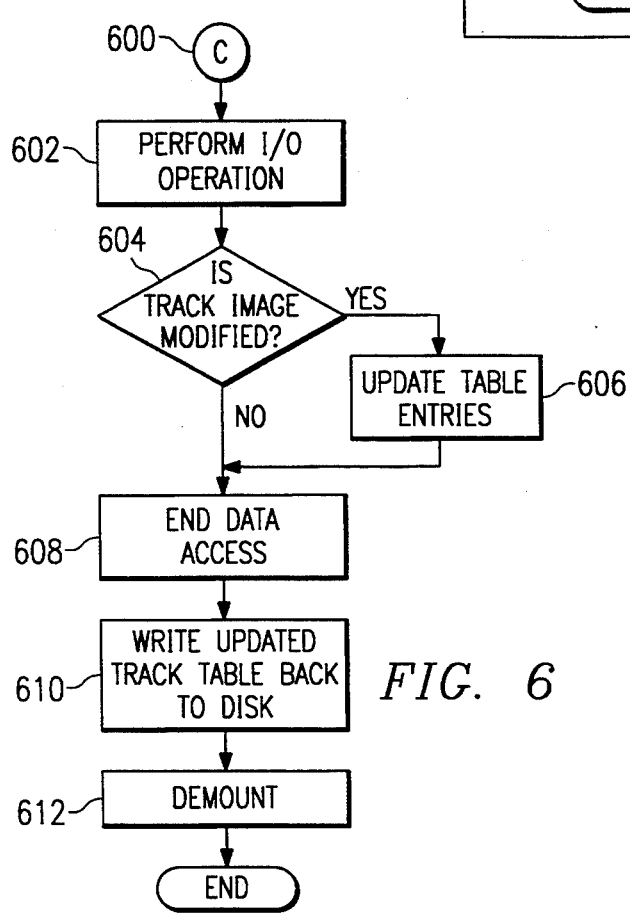

Referring now to the flowchart of FIG. 6, the final steps will be described. The data is read from or written to the track buffer (Step 602) and a determination made as to whether the track image was modified (Step 604). If the track image was not modified, the track access is complete (Step 608); otherwise, the memory track table is updated (Step 606) to reflect the changes to the track image and the track access is complete (Step 608).

Other tracks on the disk surface can be subsequently accessed during the same mount. When the host 22 no longer requires access to the surface of the disk 14, the media track table is overwritten with the updated memory track table (Step 610), the disk 14 is demounted by the accessor 18 (Step 612) and another disk can be processed.

While the invention has been particularly shown and described with reference to preferred embodiments thereof, it will be understood by those skilled in the art that various changes in form and details may be made therein without departing from the spirit and scope of the invention.

What is claimed is:

1. A method of accessing tracks on an optical disk surface, comprising the steps of:
   mounting an optical disk in a disk drive, the optical disk having at least one recordable surface with a plurality of data tracks;
   determining whether the recordable surface of the optical disk has been formatted;
   if the surface has not been formatted, formatting the surface by recording a VOLSER and a media track table onto the surface, the media track table having an entry for each of the plurality of data tracks indicating that each has a status of UNRECORDED;
   copying the media track table into a memory track table within a controller;
   changing each entry in the media track table indicating that the condition of each track is UNKNOWN;
   determining the nature of a track access operation requested by a host device to which the drive is attached;
   performing the requested track access operation;
   updating the memory track table to reflect new and modified information recording to any tracks on the disk surface during the track access operation; and
   overwriting the media track table with a copy of the updated memory track table.

2. The method of claim 1, further comprising the step of, following said changing step, determining the status of the selected track from the memory track table.

3. The method of claim 2, further comprising the step of, if the status of the selected track is virgin or the nature of the requested operation is a format write, creating a track buffer image from commands transmitted by the host device.

4. The method of claim 2, further comprising the steps of, if the status of the selected track is not virgin and the nature of the requested operation is not a format write:
   determining whether the track condition is KNOWN;
   if the track condition is KNOWN, staging a number of sectors from the optical disk to a track buffer, the number of sectors being being less than or equal to a full block of sectors and being determined from an entry in the memory track table; and
   if the track condition is not KNOWN, staging a full block of sectors from the optical disk to the track buffer.

5. A system for emulating DASD volumes with an automated storage and retrieval library for optical media, comprising:
   a system controller interconnected with a host device;
   an array of storage cells for retaining a plurality of optical volumes, each optical volume having a plurality of recordable data tracks on a surface thereof;
   an optical drive interconnected with said system controller; and
   an accessor for transporting a selected one of the optical volumes between a storage cell and said optical drive;
   said optical drive comprising:
     means for formatting a selected one of the optical volumes by recording to the surface thereof a media track table having an entry for each track indicating that each track has a virgin status; and
     means for reading and updating the media track table at the direction of said system controller;
   said system controller comprising:
     means for receiving a copy of the media track table upon receiving a command from the host device to perform a track access operation;
     memory means for storing the copy of the media track table in a memory track table;
     means for overwriting the media track table to indicate that each track has a condition of UNKNOWN;
     means for directing the optical drive to perform the requested track access operation;
     means for updating the memory track table to reflect new and modified data recording to any tracks on the disk surface during the track access operation; and
     means for overwriting the media track table with a copy of the memory track table.

6. The system of claim 5, wherein the memory track table comprises:
   a first entry for each track indicating the condition of the track; and
   a second entry for each track indicating the number of recorded sectors on the track.

7. A method of formatting an optical storage and retrieval system, comprising the steps of:
   transporting one of a plurality of optical disks from a storage cell to an optical drive;
   mounting the optical disk in the drive such that data tracks on a first recordable surface of the optical disk are accessible;
   recording a VOLSER to the first surface;
   recording a media track table to the first surface containing an entry for each of the data tracks on the first surface, the entry indicating that the corresponding track has a virgin status;
   demounting the optical disk; and
   repeating the foregoing steps for each other recordable surface in the optical storage and retrieval system.

* * * * *